(12) United States Patent
Pearson et al.

(10) Patent No.: US 8,062,109 B1
(45) Date of Patent: Nov. 22, 2011

(54) DUST SUPPRESSOR FOR COMBINE HARVESTER FEEDERHOUSE

(75) Inventors: Mark L. Pearson, LeClaire, IA (US); Ryan P Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/870,051

(22) Filed: Aug. 27, 2010

(51) Int. Cl.
*A01F 12/00* (2006.01)
*F26B 25/22* (2006.01)

(52) U.S. Cl. .......................................... 460/59

(58) Field of Classification Search .......... 460/59, 460/117, 16, 112; 100/102; 55/283, 294, 55/301
See application file for complete search history.

(56) References Cited

U.S. PATENT DOCUMENTS

| | | | | |
|---|---|---|---|---|
| 2,832,187 A * | 4/1958 | Johnson | | 56/207 |
| 3,094,829 A * | 6/1963 | Claas | | 56/13.3 |
| 3,187,491 A * | 6/1965 | Karlsson | | 56/13.3 |
| 3,213,598 A * | 10/1965 | Olsson | | 56/13.3 |
| 3,392,832 A * | 7/1968 | Allen | | 209/318 |
| 3,669,124 A * | 6/1972 | De Coene et al. | | 460/59 |
| 4,501,282 A * | 2/1985 | Muller et al. | | 460/114 |
| 4,753,296 A * | 6/1988 | Kruithoff | | 171/26 |
| 4,866,919 A * | 9/1989 | Brooks | | 56/12.9 |
| 5,322,472 A * | 6/1994 | Little | | 460/117 |
| 5,368,522 A * | 11/1994 | Ricketts et al. | | 460/16 |
| 5,595,537 A * | 1/1997 | Jungemann et al. | | 460/100 |
| 6,036,600 A * | 3/2000 | Kruckman | | 460/117 |
| 6,193,772 B1 * | 2/2001 | Wiefel | | 55/283 |
| 6,974,487 B2 * | 12/2005 | Twiefel | | 55/289 |
| 6,979,261 B1 * | 12/2005 | Day et al. | | 460/59 |
| 7,507,270 B2 * | 3/2009 | Maas et al. | | 55/385.3 |
| 2007/0135935 A1 * | 6/2007 | Maertens et al. | | 700/28 |
| 2010/0267432 A1 * | 10/2010 | Roberge et al. | | 460/59 |

* cited by examiner

*Primary Examiner* — Arpad Fabian-Kovacs

(57) ABSTRACT

A combine harvester includes a dust suppressor arrangement including an air duct arrangement which is coupled between an enclosed zone, extending rearwardly from the discharge end of the feederhouse and above a transverse crop conveying arrangement, and a cleaner fan arrangement so that the fan arrangement draws dust-laden air through the duct arrangement from the zone and discharges the dust-laden air into the chaffer and sieve arrangement of the crop cleaning arrangement.

19 Claims, 6 Drawing Sheets

DUST SUPPRESSOR FOR COMBINE HARVESTER FEEDERHOUSE

FIELD OF THE INVENTION

The present invention relates to combine harvesters, and more particularly relates to dust suppressors for the feederhouses of such harvesters.

BACKGROUND OF THE INVENTION

A problem long recognized to exist with the operation of combine harvesters is that of the airborne dust resulting from gathering the harvested crop and conveying the crop through the feederhouse toward the threshing system provided following the feederhouse. In particular, the flow of material through the feederhouse is met with an opposite airflow, caused by the backpressure of the cleaning fan and/or other processing elements which produces a large plume of dust exiting the feederhouse. This plume of dust obstructs the operator's view of the gathering head, which is desirable in order for the operator to discern any difficulties and make any necessary adjustments.

Over the years, various schemes have been attempted for alleviating the dust/visibility problem. Specifically, U.S. Pat. Nos. 3,094,829; 3,187,491; 3,213,598; 5,322,472 and 6,036,500 each disclose dust collection devices comprising collection chambers mounted at various locations along associated feederhouses, the chambers containing a fan and being in communication with the inside of the feederhouse so that the fan draws dust into the housing and expels it through discharge chutes arranged in various ways for discharging the dust at various locations including on the ground alongside the feederhouse, (first three and last of the cited patents) into the chaffer sieve or straw chopper (the fourth cited patent). Another type of device is disclosed in U.S. Pat. Nos. 3,669,224 and 6,979,261, which each include an air deflector located between the discharge end of the feederhouse, the deflector, in case of the first cited patent, being located so as to prevent an air stream generated by an undershot threshing cylinder from creating turbulence at the discharge end of the feederhouse by deflecting the air back to an underside of the threshing cylinder, with the deflector, in the case of the second-cited patent, being located so as to prevent backflow from a beater and to channel air exiting the feederhouse along a path passing over the deflector and into the processing chamber of an axial threshing rotor.

The prior art devices utilizing fans have the disadvantage that they are auxiliary or add-on devices which are not very cost effective, and the fan arrangements of some of the devices draw air in a direction opposite to that of crop flow and/or are prone to plugging. While the prior art devices utilizing air deflectors are cost effective, they are not entirely satisfactory since they interfere with crop flow and in instances where the crop processor elements are running slow, the air flow created is not sufficient to draw off the dust.

SUMMARY OF THE INVENTION

According to the present invention, there is provided a dust suppressor arrangement for a combine harvester, and more specifically, there is provided a dust suppressor arrangement which draws dust-laden air from the vicinity of the discharge end of the feederhouse.

A broad object of the invention is to provide a combine dust suppressor arrangement which is highly functional and cost effective.

A more specific object of the invention is to provide a dust suppressor arrangement which makes use of the combine grain cleaning fan for creating a flow of air for drawing off dust from a location between the discharge end of a feederhouse and the feed section of the grain separator.

The foregoing objects are accomplished by providing ductwork between the cleaning fan and a zone between the feederhouse and the feed section of the separator such that the cleaning fan creates a rearward air flow so as to be in the same direction as the material flow.

These and other objects will be apparent from a reading of the ensuing description together with the accompanying drawings.

DESCRIPTION OF THE PREFERRED EMBODIMENT

Figure 1:
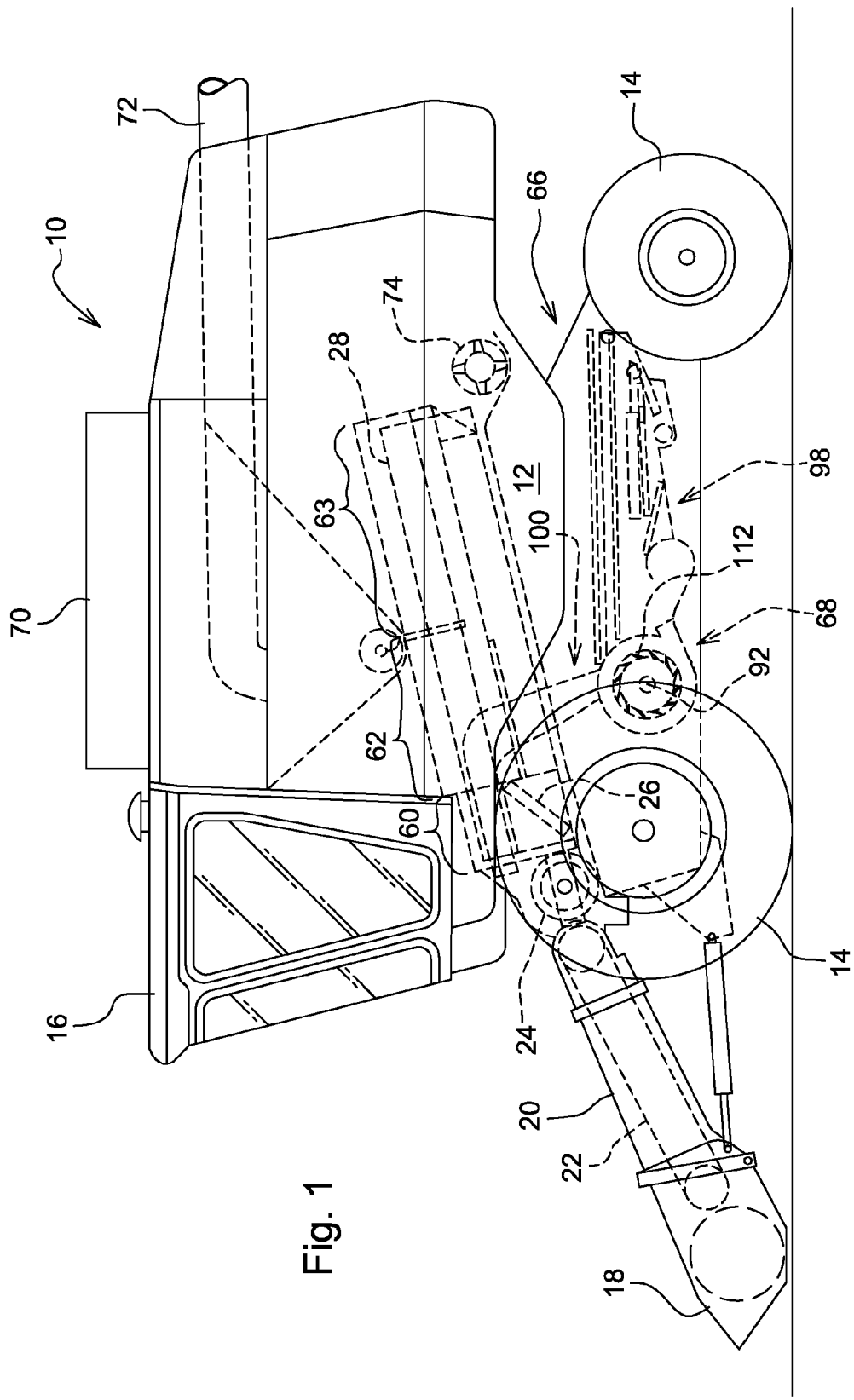
FIG. 1 is left side schematic view of an agricultural combine having a crop processing arrangement comprising an axial rotor arrangement and embodying the dust suppressor arrangement of the present invention.

Referring now to FIG. 1, there is shown a self-propelled agricultural combine 10 including a support structure 12 carried by front and rear pairs of ground wheels 14. The combine 10 is controlled from an operator cab 16 mounted to an upper front location of the support structure 12.

A harvesting platform 18 mounted at a forward end of the combine 10 is used for harvesting a crop and directing it to a feederhouse 20, which contains an endless conveyor 22 for conveying the harvested crop from an outlet of the platform 18 to an undershot crop feed beater 24. The beater 24 directs the crop upwardly along a guide plate 26 to an inlet in a lower front region of an axial crop processing assembly 28, noting that the beater 24 and guide plate 26 could be considered part of the crop processing assembly 28.

The crop processing assembly 28 illustrated in FIG. 1 is a rotary threshing and separating assembly that extends in the direction of a longitudinal axis of the combine 10. Although the present invention is primarily described and illustrated as being used in a combine having a twin axial rotor assembly (see FIGS. 2-5), the present invention can also be used in a combine having a single, axially disposed threshing and separating rotor, or having a transverse threshing cylinder and concave assembly, or having a transverse rotor assembly.

Figure 2:
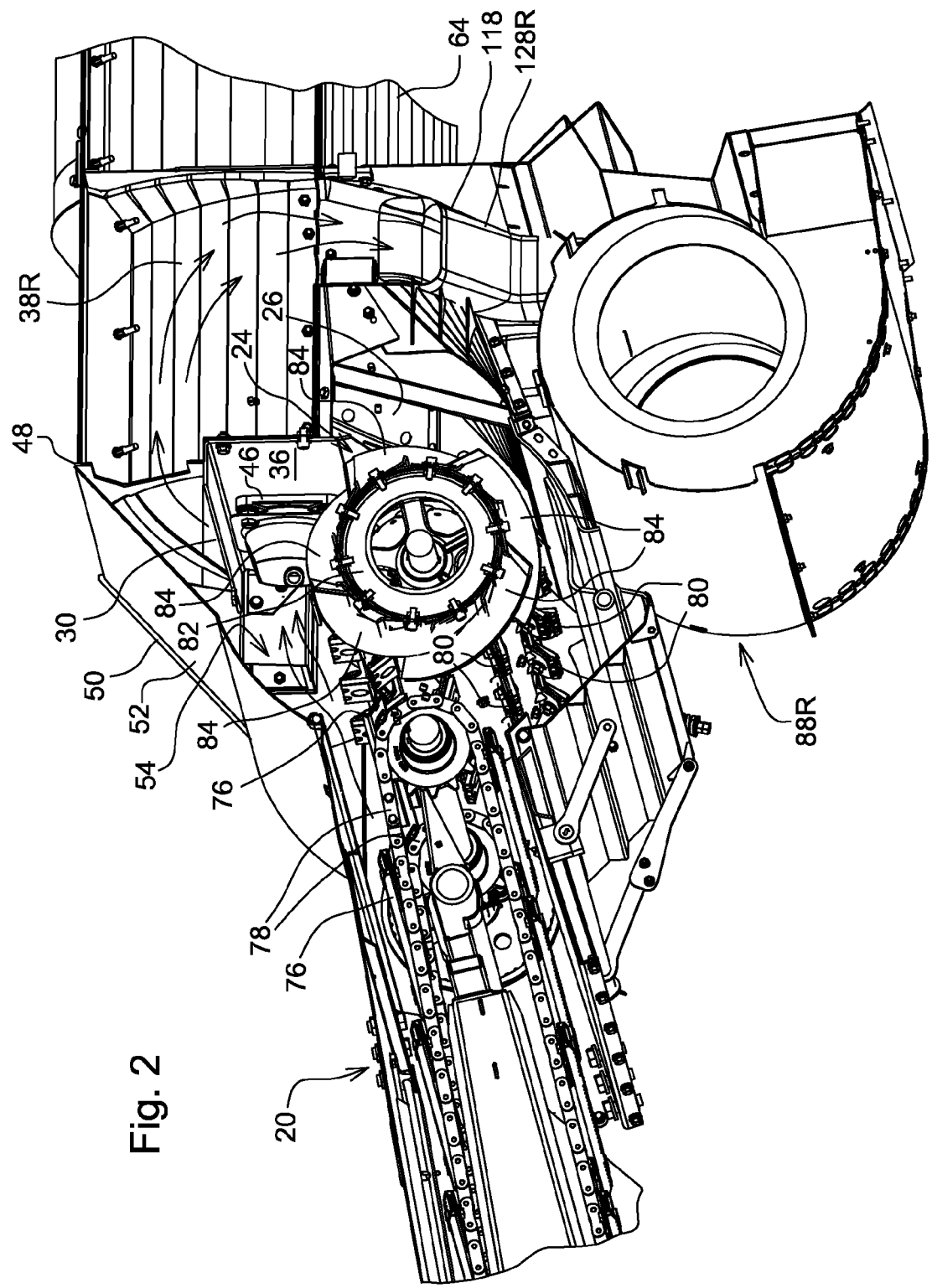
FIG. 2 is a left front perspective view, with parts broken away, of a region of the combine containing the dust suppressor arrangement of the present invention and showing the cleaning fan and portions of the associated duct arrangement for drawing dust-laden air from an enclosed zone extending from a location over the discharge end of the feederhouse conveyor to a location over a transverse crop beater located just behind the conveyor.
Figure 3:
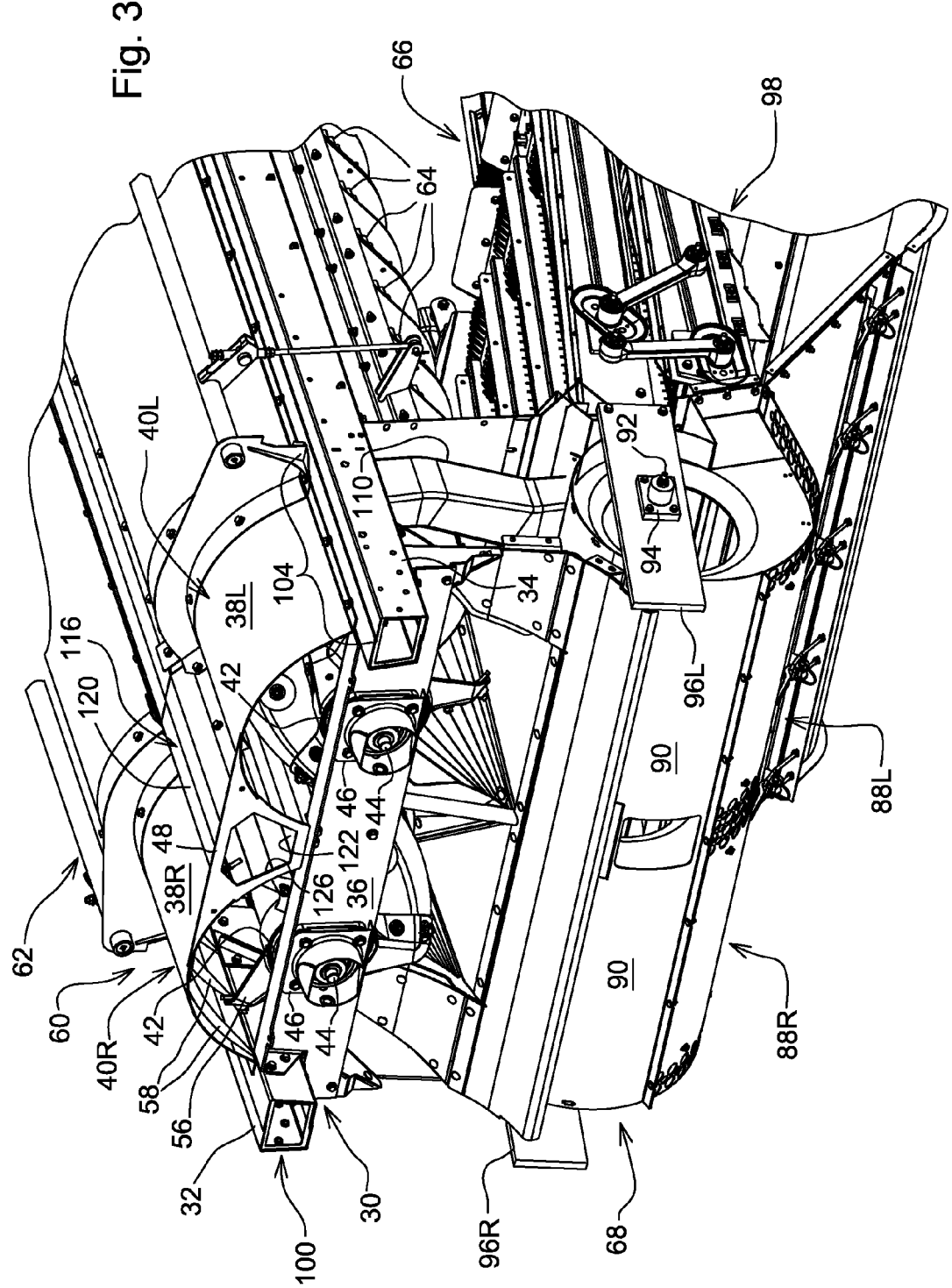
FIG. 3 is a left front perspective view of the combine region shown in FIG. 2, but from a slightly different vantage point and omitting the feederhouse and beater.
Figure 4:
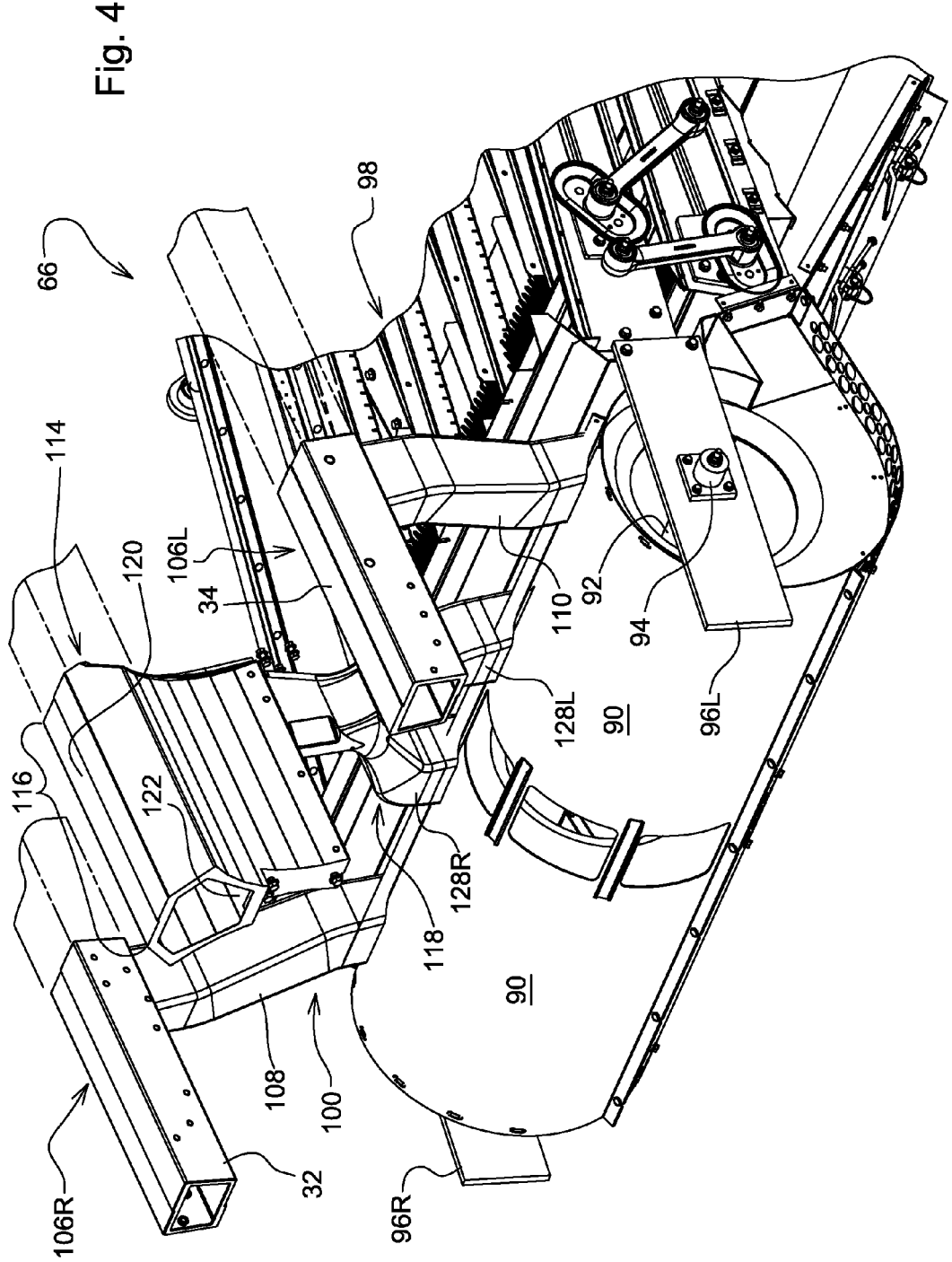
FIG. 4 is a left front perspective view of the dust suppressor arrangement shown in FIG. 3.
Figure 5:
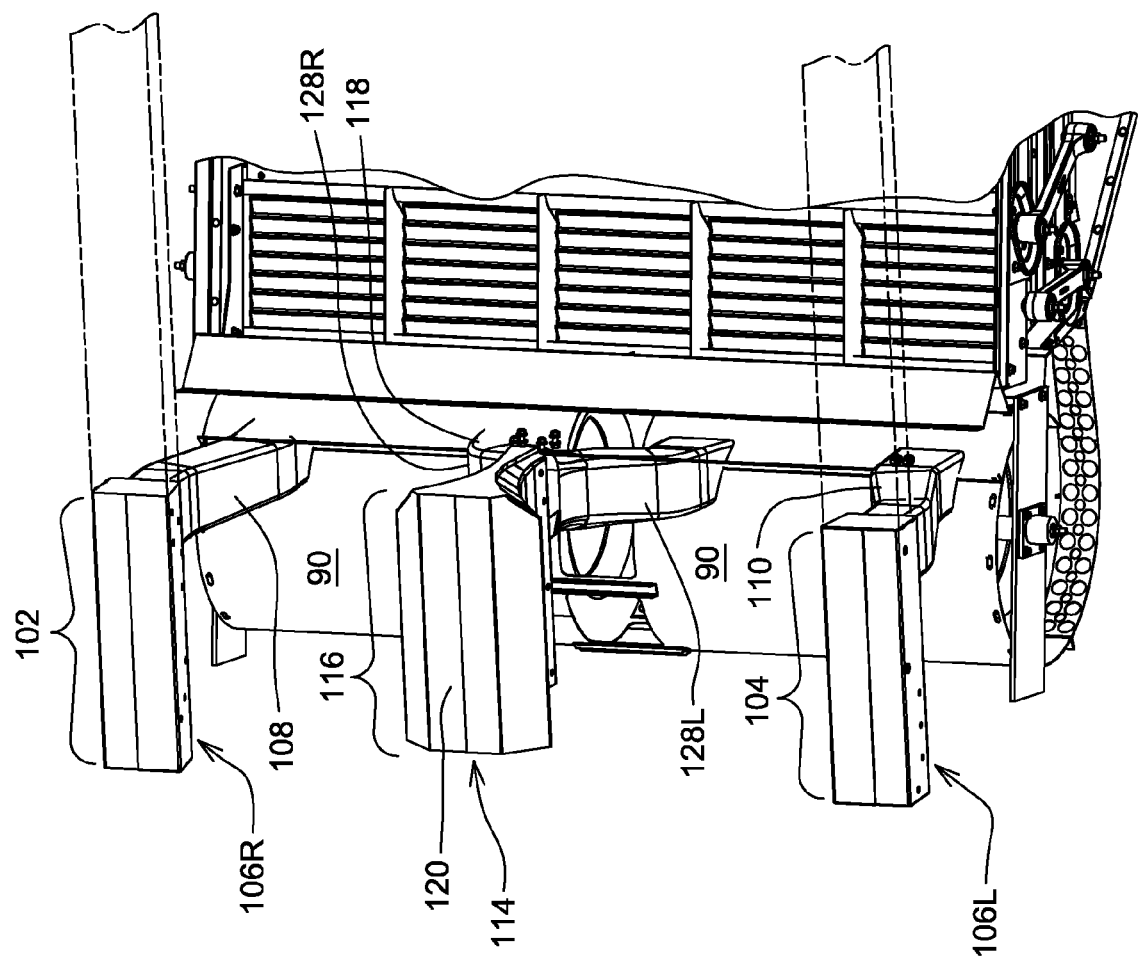
FIG. 5 is a left rear top perspective view of the dust suppressor arrangement shown in FIG. 4.

Referring now also to FIGS. 2 and 3, it can be seen that the crop processing assembly 28 comprises a support frame 30 including parallel, transversely spaced, fore-and-aft extending, right- and left-hand side frame members 32 and 34, respectively, and an inverted L-shaped cross frame member 36 extending between, and joined to, forward regions of the side frame members.

The crop processing assembly 28 further includes right- and left-hand, substantially cylindrical rotor housings 38R and 38L in which are respectively located right- and left-hand threshing and separating rotors 40R and 40L, the rotors each having a central tubular rotor body 42, with a front part of each rotor body having a forwardly tapered, frusto-conical shape and being fixed to a forwardly projecting stub shaft 44, which is received for rotating within a bearing assembly 46 fixed to the frame cross member 36. Rear stub shafts (not shown) are fixed to a rear region of the rotor bodies and are mounted for rotation within bearings fixed to a rear frame cross member. An upright support plate 48, having a function described below, has a lower central region fixed to a top surface of the short leg of the inverted L-shaped cross frame member 36 at a central region between the rotor housings 38R and 38L. Opposite sides of the support plate 48 are shaped complimentary to, and are respectively fixed to, forward ends of the adjacent curved side portions of the rotor housings 38R and 38L. Vertical side walls (FIG. 2 only), of which only a right side wall 50 is shown, are fixed to and project above, below, and forwardly of the right and left side frame members 32 and 34 so as to be located at opposite ends of the crop beater 24. A cover 52 extends between, and is joined to, the side walls 50, the cover 52 having a rear edge supported across a top edge of the support plate 48 and being inclined downwardly in diverging relationship to the support plate 48 to a location spaced above the support frame cross member 36 and, from there, being formed at a radius having the axis of the feed beater 24 as its center, with a forward end of the cover terminating at a top side of the feederhouse 20. An enclosed zone 54 is thus defined between the discharge end of the feederhouse 20 and the infeed end of the rotor housings 38R and 38L into which dust-laden air flows when a crop is being harvested by the combine 10.

Fixed to front frusto-conical part of each of the rotor bodies 42 are helical conveying elements 56, which cooperate with spiral vanes 58 fixed to the inside of the front part of each of the rotor housings 38R and 38L in order to feed crop material rearwardly within the housings. Thus, the forward parts of the housings 38R and 38L and of the rotors 40R and 40L define an infeed section 60. Immediately downstream from the infeed section 60 is a threshing section 62, and downstream from the threshing section 62 is a separating section 63.

The crop processing assembly 28 threshes and separates the harvested crop material as it travels through the threshing section 62. Grain and chaff fall through grates 64, embodied in a lower half of each of the rotor housings 38R and 38L, to a cleaning arrangement 66 supported beneath the crop processing assembly 28.

The cleaning arrangement 66 includes a cleaning fan arrangement 68 which creates a blast of rearwardly and upwardly directed air that removes chaff from the grain, with the clean grain being directed to a clean grain elevator (not shown). The clean grain elevator deposits the clean grain in a grain tank 70 located behind the cab 16 and which can be unloaded by an unloading auger 72. Meanwhile, the separated chaff is ejected out the rear of the combine 10. The residual crop material that has been threshed and separated includes neither grain nor chaff and is discharged rearwardly from the crop processing assembly 28 into a discharge beater 74, which, in turn, propels the residual crop material out the rear of the combine 10.

Referring now also to FIG. 2, it can be seen that the endless conveyor 22 is a chain conveyor having slats 76 extending transversely between drive chains 78. The undershot feed beater 24 has beater elements 80 arranged along a cylindrical drum member 82 of the beater between right and left sets of helically disposed crop centering fins 84 (only the left set being visible) that move crop material from the feederhouse 20 into the processing assembly 28 by way of the upwardly sloped guide plate 26. In certain harvesting conditions, the rotating feed beater 24 can create an undesirable reverse air flow in the feederhouse 20 causing turbulence which can result in an air lock or air stall at the feederhouse 20. In these situations, dust and crop particulates can be forced out or escape from the feederhouse and into the field of vision of an operator seated in the cab 16.

The present invention is provided for ameliorating the just-mentioned condition. Specifically, referring now also to FIGS. 3-5, it can be seen that the cleaning fan arrangement 68 includes right- and left-hand cleaning fans 88R and 88L which are disposed transversely to the longitudinal axis of the combine 10 and are located in axial alignment with each other. The fans 88R and 88L include identical scroll-shaped housings 90 and share a drive shaft 92 which extends horizontally through the housings and has opposite ends mounted for rotation in bearings 94 carried by right- and left-hand brackets 96R and 96L projecting forwardly from a chaffer and sieve arrangement 98. U.S. Pat. No. 6,921,330, dated Jul. 26, 2005 discloses a suitable cleaner fan and is incorporated herein in its entirety, noting that each of the fans 88R and 88L could be similar to the patented fan, but are not required to be so for the purposes of the present invention. The drive shaft 92 may be driven at different speeds, in any well known manner, in order to provide varying amounts of cleaning air to efficiently clean varying amounts of crop material under varying crop conditions.

An air duct arrangement 100 is provided which extends between opposite end locations of each of the fan housings 52 and upper, opposite side and middle locations of the enclosed zone 54. More specifically, the air duct arrangement 100 is formed in part by the right and left side frame members 32 and 34, respectively, which are each defined by tubes having a rectangular cross section, with front sections 102 and 104, respectively of the frame members 32 and 34 defining fore-and-aft extending portions of right and left air ducts 106R and 106L. The ducts 106R and 106L respectively include right and left upstanding, tubular portions 108 and 110 having upper ends joined to rear ends of the frame sections 102 and 104, and having respective lower ends mounted to upper rear locations at outer ends of each of the fan housings 90 so as to be in communication with the interiors of the housings so that fan blades 112, carried by the drive shaft 92, draw dust-laden air through the ducts 106R and 106L and discharge the air upwardly into the chaffer and sieve arrangement 98. A further air duct 114 is mounted centrally between the ducts 104R and 104L and includes a fore-and-aft extending duct portion 116 having a rear end joined to an inverted Y-shaped duct portion 118.

The fore-and-aft extending duct portion 116 is formed in part by the rotor housings 38R and 38L. Specifically, the duct portion 116 includes a three-sided top 120 having opposite, fore-and-aft extending edges which abut, and are fixed to, facing sides of the housings 38R and 38L, and having a relatively narrow, rectangular bottom 122 extending parallel to a top wall of the top section, with opposite edges of the bottom 122 abutting the rotor housings 38R and 38L at respective locations spaced below the top 120. Thus, the top 120, rotor housing side walls and bottom 122 cooperate to form the duct portion 116. As can best be seen in FIG. 3, a forward end of the duct portion 116 abuts the upright support plate 48 which includes a six-sided opening 126 located in the central region thereof matching that of the front end of the duct portion 116 and being in direct communication with a central, upper location the enclosed zone 54.

The upright, inverted Y-shaped duct portion 118 has upper and lower ends of the stem of the Y respectively joined to a rear end of the fore-and-aft extending duct section 116, and to upper ends of right and left branches 128R and 128L having lower ends respectively coupled to inner ends of the housings 90 of the right and left cleaning fans 88R and 88L so that the blades 112 of the cleaning fans draw dust-laden air in from the enclosed zone 54 and discharges this air upwardly into the chaffer and sieve arrangement 98.

While the combine shown is equipped with a twin threshing and separating rotor and is provided with the cleaning fan arrangement 68 which includes two cleaning fans 88R and 88L, it is to be understood that the present invention would work just as well with a combine having only one threshing and separating rotor and only one cleaning fan, in which case the center air duct 114 would be omitted.

Figure 6:
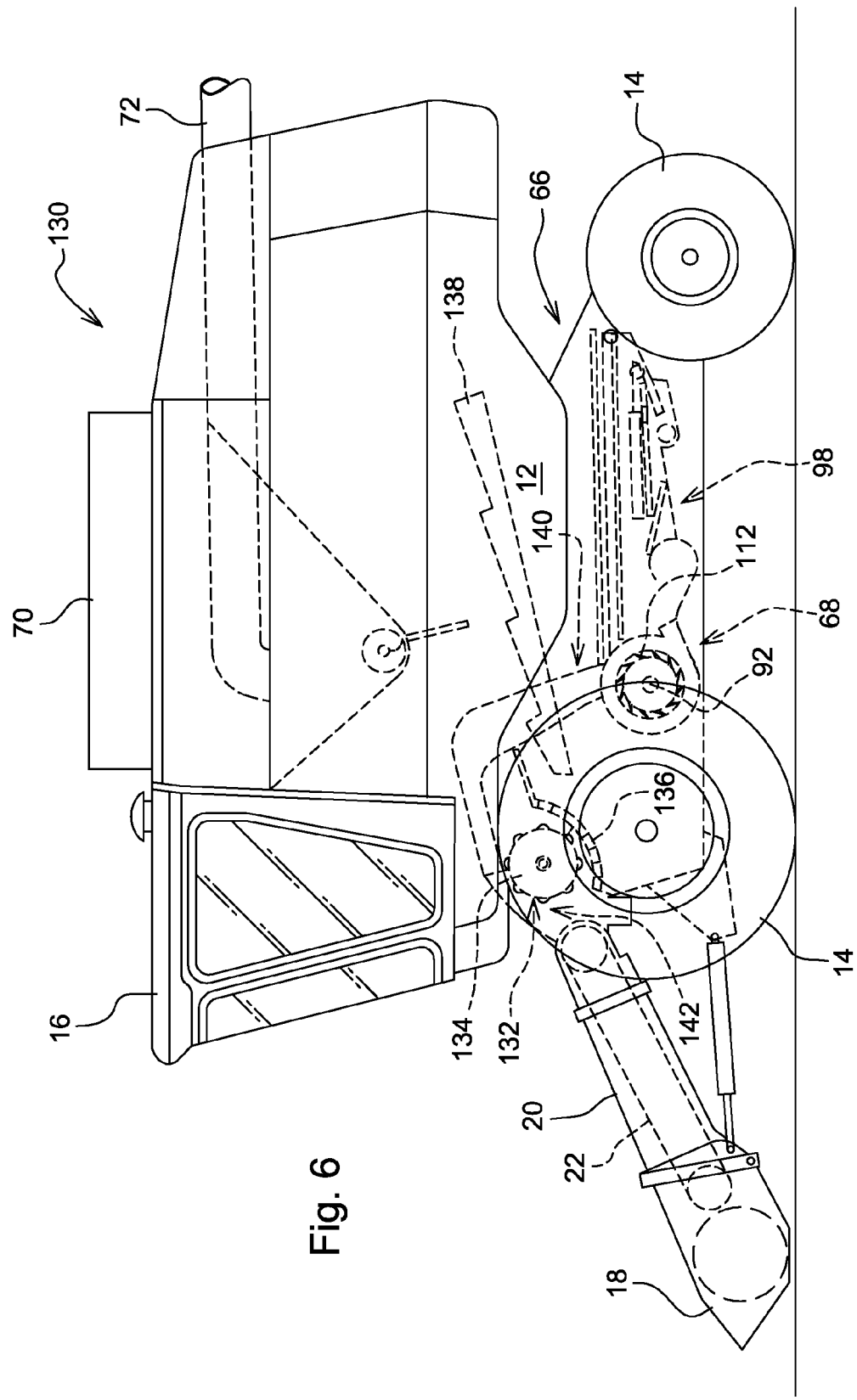
FIG. 6 is a left side schematic view showing the dust suppressor of the present invention embodied in a combine equipped with a processing arrangement comprising a transverse cylinder and concave arrangement.

Referring now to FIG. 6, there is shown a second embodiment of the dust suppressor arrangement embodied in a combine 130 having a crop processing assembly 132 including a transverse threshing cylinder 134 disposed above a concave 136. Crop material other than grain and chaff is impelled to the rear onto a straw walker arrangement 138 that moves the material to the rear of the combine. As was the case with the first embodiment, the cleaning arrangement 66 is located beneath the crop processing assembly 132 and includes the cleaning fan arrangement 68, with the blades 112 generating a blast of air which is directed upwardly through the chaffer and sieve arrangement 98 in order to clean any grain located there.

The dust suppressor of the present invention resides in the combination of a tubular air duct arrangement 140 and the cleaning fan arrangement 68. Specifically, the duct arrangement 140 has an inlet end arrangement located in communication with an enclosed zone 142 extending between the rear of the feeder house 20 and above the cylinder 134, and has an outlet arrangement in communication with the blades 112 of the cleaning fan arrangement 68 so that dust-laden air is drawn from the zone 142 and expelled in the air blast that is directed upwardly through the chaffer and sieve arrangement Thus, it will be appreciated that the cleaning fan arrangement 68 acts not only to generate and direct air blasts across the cleaning arrangement 66 for cleaning chaff from grain, but also acts, together with the air duct arrangement 100 or 140 to cause a positive flow of air in the rearward direction of crop flow through the combine 10 or 130 so as to draw dust-laden air from the enclosed zone 54 or 142 and discharge such air through the cleaning arrangement 66 and, in that way, serve as a feederhouse dust suppressor. Accordingly, no extra fan components and associated fan drive systems are necessary for suppressing dust laden air, which results in a cost savings over prior art systems which use auxiliary fans and drives.

Having described the preferred embodiment, it will become apparent that various modifications can be made without departing from the scope of the invention as defined in the accompanying claims.

The invention claimed is:

1. An agricultural combine for harvesting, threshing and separating an agricultural crop, the combine comprising: a harvesting platform for gathering the crop; a feederhouse mounted for receiving crop from the platform and including a conveyor mechanism for conveying the crop rearwardly to a crop processing assembly including a transverse crop-conveying rotor located just rearwardly of the feederhouse for continuing rearward conveyance of the crop; a crop cleaning arrangement located beneath said crop processing assembly and including a cleaning fan arrangement for causing a rearwardly oriented blast of air at an outlet side thereof; and a dust suppressor arranged for preventing an accumulation of dust-laden air in an enclosed zone extending between an upper end of said feederhouse and an upper side of said crop conveying rotor, the dust suppressor including said cleaning fan and further including an air duct arrangement extending between said cleaning fan and said zone in such a manner that air discharged from said cleaning fan arrangement includes dust laden air drawn through said duct arrangement from said enclosed zone.

2. The combine, as defined in claim 1, wherein said air duct arrangement includes at least one tube having an inlet located at said zone and having an outlet located in communication with said cleaning fan arrangement.

3. The combine, as defined in claim 1, wherein said air duct arrangement includes at least two tubes having respective inlets located at said zone and having respective outlets located in communication with said cleaning fan arrangement.

4. The combine, as defined in claim 1, wherein said air duct arrangement includes an inlet arrangement located approximately vertically above an axis of said crop conveying rotor.

5. The combine, as defined in claim 4, wherein said duct arrangement includes at least two separate ducts having respective inlet ends located approximately vertically above said axis of said crop conveying rotor.

6. The combine, as defined in claim 1, wherein said crop conveying rotor is an undershot crop feed beater, with said crop processing assembly including an axial rotor arrangement having an axial threshing section.

7. The combine, as defined in claim 6, wherein said axial rotor arrangement includes side-by-side rotors including parallel, longitudinally extending shafts, and a framework including a transversely spaced pair of longitudinally extending tubular frame members joined together by a cross member rotatably supporting forward ends of said shafts of said rotors; and said two separate ducts respectively including a forward section of each of said pair of longitudinally extending tubular frame members.

8. The combine, as defined in claim 7, wherein said side-by-side rotors each include an approximately semi-cylindrical upper housing portion respectively having out-turned edges overlying and secured to said tubular frame members; an arched bridging member extending between and being joined to inner locations of each of said semi-cylindrical housings so as to form a portion of a fore-and-aft extending central tube member, and said central tube member forming a portion of a third air duct extending between said zone and said crop cleaning fan arrangement.

9. The combine, as defined in claim 7, wherein said cleaning fan arrangement comprises first and second cleaning fans located axially aligned with each other and respectively beneath said side-by-side rotors; and said third duct being of an inverted Y-shape, with lower end portion defining separate ducts respectively coupled one each to said first and second cleaning fans.

10. The combine, as defined in claim 1, wherein said crop conveying rotor is a transverse threshing cylinder.

11. In a combine including a harvesting platform coupled for delivering harvested crop to an upwardly and rearwardly inclined feederhouse including an endless crop conveyor for moving crop from the platform to a transverse crop conveying rotor located rearwardly of, and adjacent to, a discharge end of said feederhouse, a cleaning arrangement being located beneath a crop processing assembly including said crop conveying rotor, the cleaning arrangement including a transverse cleaning fan arrangement for generating a blast of rearwardly directed air, the improvement comprising: a dust suppressor arrangement including said cleaning fan and further including an enclosed duct arrangement having an inlet end arrangement located in a zone extending between said endless crop conveyor and said crop conveying rotor, and having an outlet end arrangement located so as to be in communication with said cleaning fan arrangement, whereby said cleaning fan arrangement draws dust-laden air from said zone and discharges it within said air blast of rearwardly directed air.

12. The combine, as defined in claim 11, wherein said duct arrangement includes at least one duct having inlet and outlet ends respectively coupled in communication with said zone and said cleaning fan arrangement.

13. The combine, as defined in claim 11, wherein said cleaning fan arrangement includes first and second cleaning fans disposed side-by-side in axial alignment with each other; and said duct arrangement including first and second ducts having respective inlet ends located in communication with said zone and having respective outlet ends respectively in communication with said first and second cleaning fans.

14. The combine, as defined in claim 11 wherein said processing arrangement includes first and second, side-by-side threshing rotors extending longitudinally in said combine; and said duct arrangement including at least one enclosed duct including a fore-and-aft extending portion located centrally between said threshing rotors and having inlet and outlet ends respectively coupled in communication with said zone and with said cleaning fan arrangement.

15. The combine, as defined in claim 14, wherein said cleaning fan arrangement includes first and second, side-by-side, axially aligned cleaning fans; and said at least one enclosed duct having a second portion extending downwardly from said fore-and-aft extending portion and being bifurcated and having outlet end portions respectively coupled in communication with said first and second cleaning fans.

16. The combine, as defined in claim 14, wherein said threshing rotors each include an upper, substantially semi-cylindrical housing, with the housing of each threshing rotor forming at least part of said fore-and-aft extending portion of said at least one enclosed duct.

17. The combine, as defined in claim 14, wherein said processing arrangement includes a framework comprising first and second, longitudinally extending tubular frame members located on opposite sides of, and connected in supporting relationship to said threshing rotors; and said duct arrangement including first and second enclosed ducts respectively formed in part by said first and second tubular frame members, and having respective inlet ends coupled for receiving dust laden air from said zone, and having respective outlet ends connected in communication with said cleaning fan arrangement.

18. The combine, as defined in claim 17, wherein said threshing rotors each include an upper, approximately semi-cylindrical housing, with the housing of each threshing rotor forming at least part of said fore-and-aft extending portion of said at least one enclosed duct.

19. The combine, as defined in claim 11, wherein said transverse crop conveying rotor is a threshing cylinder.

* * * * *